(12) United States Patent
Matsushita

(10) Patent No.: US 6,656,037 B2
(45) Date of Patent: Dec. 2, 2003

(54) CONNECTOR

(75) Inventor: Yasuo Matsushita, Yokkaichi (JP)

(73) Assignee: Sumitomo Wiring Systems, Ltd (JP)

( * ) Notice: Subject to any disclaimer, the term of this patent is extended or adjusted under 35 U.S.C. 154(b) by 0 days.

(21) Appl. No.: 10/152,606

(22) Filed: May 21, 2002

(65) Prior Publication Data

US 2002/0182933 A1 Dec. 5, 2002

(30) Foreign Application Priority Data

May 30, 2001 (JP) ........................................ 2001-163227

(51) Int. Cl.[7] .............................................. H01R 13/73
(52) U.S. Cl. ........................ 459/544; 439/157; 439/352
(58) Field of Search ................................ 439/544, 157, 439/372, 152, 352, 310, 153, 154, 155, 156

(56) References Cited

U.S. PATENT DOCUMENTS

| | | | | |
|---|---|---|---|---|
| 5,791,935 A | * | 8/1998 | Yamanashi | 439/489 |
| 5,848,908 A | * | 12/1998 | Katsuma | 439/157 |
| 5,938,458 A | * | 8/1999 | Krehbiel et al. | 439/157 |
| 6,012,933 A | * | 1/2000 | Katsuma | 439/157 |
| 6,213,791 B1 | * | 4/2001 | Kodama | 439/157 |
| 6,332,789 B1 | * | 12/2001 | Okabe | 439/157 |

FOREIGN PATENT DOCUMENTS

JP 9-245886 9/1997

* cited by examiner

*Primary Examiner*—P. Austin Bradley
*Assistant Examiner*—Edwin A. León
(74) *Attorney, Agent, or Firm*—Gerald E. Hespos; Anthony J. Casella

(57) ABSTRACT

A connector (A) has first and second housings (10, 20). A lever (30) on the first housing (10) is pivotal from a standby position to a connection position for connecting the housings (10, 20). Fixed interfering ribs (16) are formed on the outer surface of a first housing (10), and movable interfering portions (35) are formed on the lever (30). Both interfering portions (16, 35) can be located in an opening area of a mount hole (H) of a panel (P) when the lever (30) is at the connection position. Thus, connector (A) can be fit into the mount hole (H). Either the movable interfering portions (35) or the fixed interfering ribs (16) bulge out of the opening area of the mount hole (H) when the lever (30) is at the standby position to interfere with an edge of the mount hole (H). Thus, the connector (A) cannot be mounted on the panel (P).

15 Claims, 6 Drawing Sheets

CONNECTOR

BACKGROUND OF THE INVENTION

1. Field of the Invention

The invention relates to a panel-mountable connector with a lever.

2. Description of the Related Art

A lever-type connector that is mountable on a panel is disclosed in Japanese Unexamined Patent Publication No. 9-245886. This connector has a male housing that is mounted in a mount hole of a panel and held in a standby state. The connector also has female housing with a lever. The lever can be operated to engage the female housing with the male housing.

Part of the female housing and the lever project at the outer side of the panel and require an operating space. However, the connector may be mounted, for example, near a hinge of a door panel of an automotive vehicle, and sufficient space cannot be assured around the body panel when the door is closed. Thus, it is difficult to use this type of standby-type lever connector.

Consideration has been given to connecting the two housings at the outer side of the door panel beforehand and then mounting the connected housings into the mount hole of the panel so that the housings and the lever are at the inner side of the door panel. In this construction, the lever is mounted pivotally on the male housing and is held at a standby position beforehand so that entrances of cam grooves of the lever open forward. The female housing then is fit lightly into the receptacle so that cam followers of the female housing enter the cam grooves. The lever then is pivoted toward a connection position to connect the housings.

The housings of the lever-type connector are concealed at the inner side of the panel, and it is difficult to detect by eye whether the lever has been rotated to the connection position. Accordingly, a demand exists for means to detect the position of the lever before completely mounting of the housings on the panel to prevent the connector from being mounted on the panel when the lever is not yet pivoted to the connection position.

The present invention was developed in view of the above problem and an object thereof is to prevent a connector from being mounted on a panel with connector housing partly coupled.

SUMMARY OF THE INVENTION

The invention is directed to a connector that is mountable in a mount hole of a panel. The connector includes first and second housings and a movable member movably mounted on first housing. The movable member is movable from a first position to a second position and cooperates with a cam mechanism on the second housing to urge the first and second housings into a properly connected condition. The connector further comprises interfering means that can be located in an opening area of the mount hole when the movable member is at the second position. The interfering means bulges out of the opening area of the mount hole when the movable member is at the first position, thereby interfering with an edge of the mount hole.

The housings are connected completely and the interfering means is in the opening area of the mount hole when the movable member is at the second position. Thus, the connector can be fit into the mount hole. On the other hand, the housings are connected only partly when the movable member is at the first position, and the interfering means bulges beyond the opening area of the mount hole. Thus, the interfering means catches the edge of the mount hole, and the connector cannot be mounted on the panel.

The cam mechanism preferably comprises a cam follower on the second housing. The cam follower can enter a cam groove in the movable member when the movable member is at the first position.

The connector preferably is a lever-type connector and the movable member preferably is a lever that pivots on a bearing of the first housing.

The first position of the movable member corresponds to a standby position and the second position corresponds to a connection position in which the housings are connected with each other.

The interfering means preferably includes at least one movable interfering portion on the movable member. The movable interfering portion is in the opening area of the mount hole when the movable portion is at the second position. However, the movable interfering portion bulges out of the opening area of the mount hole when the movable portion is at the first position, thereby interfering with an edge of the mount hole and preventing the connector from being mounted in the mount hole.

The lever preferably includes an operable portion and two parallel arms that project from the operable portion. The arms are supported pivotally on the first housing so that the operable portion is displaceable through an arc along an outer surface of the first housing between the first position and the second position. The moveable interfering portion is on an outer edge of at least one arm at a side opposite from the operable portion.

The interfering means may include at least one fixed interfering portion on an outer surface of the first housing and extending arcuately substantially along the displacement path of the operable portion without interfering with the operable portion. At least one of the movable and fixed interfering portions bulge out of the opening area of the mount hole when the movable member is at the first position.

The fixed interfering portion is in dead space between the outer surface of the first housing and a trace of displacement of the operable portion. Thus the fixed interfering portion does not make the connector larger.

The fixed interfering portion preferably comprises arcuate ribs that project from the outer surface of the first housing. The arcuate ribs preferably parallel the arcuate displacement path of the operable portion.

These and other objects, features and advantages of the invention will become more apparent upon reading the following detailed description of preferred embodiments and accompanying drawings. It should be understood that even though embodiments are described separately, single features may be combined to additional embodiments.

DETAILED DESCRIPTION OF THE PREFERRED EMBODIMENTS

Figure 1:
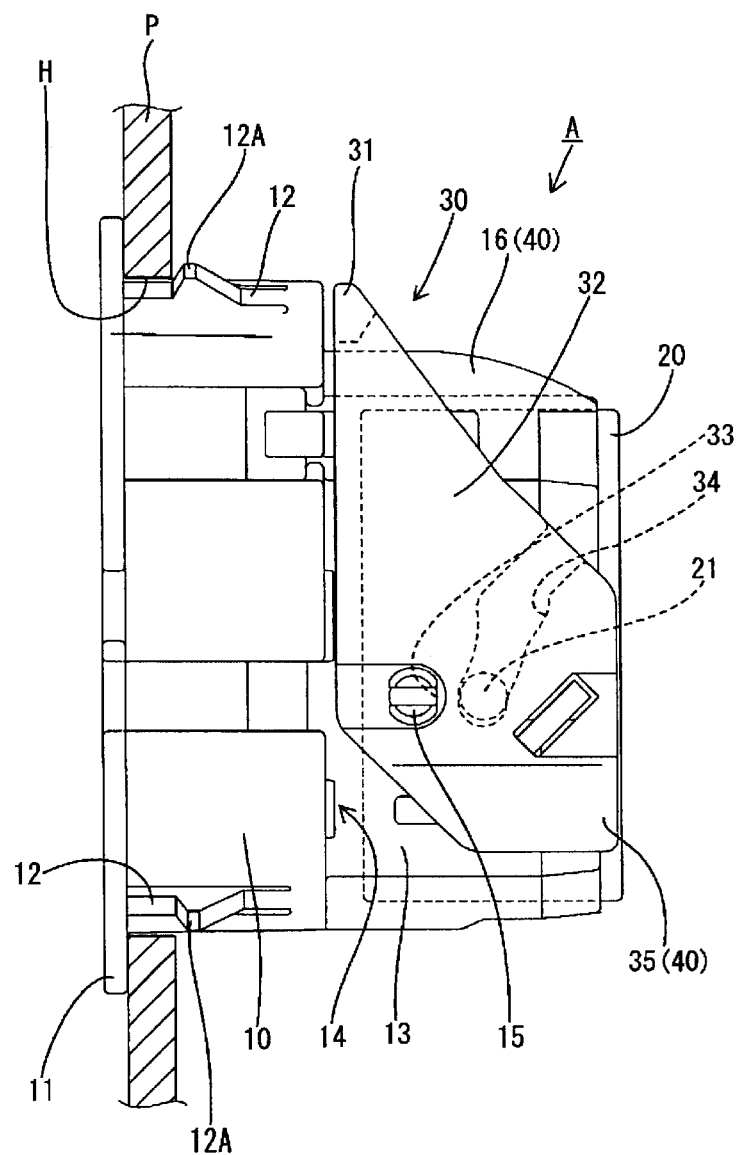
FIG. 1 is a side view showing a lever-type connector according to the invention mounted on a panel with a lever held at a connection position.

A lever-type connector in accordance with the invention is identified by the letter A in FIGS. 1–6. The lever-type connector A has a first housing 10, a second housing 20 and a lever 30 mounted on the first housing 10. The connector A is mountable into a mount hole H of a panel P after the two housings 10, 20 are connected with each other.

The first housing 10 has a substantially oblong shape with semicircular upper and lower ends. A substantially oblong flange 11 projects out at the rear end of the first housing 10 and resilient locks 12 are slightly before the flange 11. The first housing 10 has a receptacle 13 that projects forward toward a mating side. The receptacle 13 is shorter and narrower than portions of the first housing 10 adjacent the flange 11. An inverted substantially U-shaped space 14 is defined by clearances between upper and side surfaces of the first housing 10 and upper and side surfaces of the receptacle 13 when the connector A is viewed from the front. The lever 30 is provided in the space 14. The second housing 20 is fittable into the receptacle 13 from the front, and cam followers 21 project from the left and right outer surfaces thereof. Shafts 15 also project from the left and right outer surfaces of the receptacle 13, and the lever 30 is supported on the shaft portions 15.

The lever 30 has an operable portion 31 and two parallel plate-shaped arms 32 project from the opposite lateral ends of an operable portion 31. Engaging holes 33 are formed in the arms 32 and are mounted on the shafts 15. Thus, the lever 30 is pivotal about the shafts between a first or standby position, and a second or connection position. Entrances of cam grooves 34 open forward towards the mating side when the lever 30 is at the first position shown in FIG. 3, so that the cam followers 21 of the second housing 20 can enter the cam grooves 34. Leverage between the cam grooves 34 and the cam followers 21 connects the housings 10, 20 when the lever 30 is moved from the first position to the second position, as shown in FIG. 1.

The operable portion 31 is at the front end of the upper surface of the receptacle 13 of the first housing 10 when the lever 30 is at the first position. However, the operable portion 31 can be displaced back to a rear end position of the receptacle 13 as the lever 30 is pivoted to the second position. The displacement of the operable portion 31 forms an arcuate trace that is close to the upper surface of the receptacle 13 at the front end of the receptacle and is gradually spaced further away from the upper surface of the receptacle 13 toward the rear end of the receptacle 13.

The housings 10, 20 are connected by initially holding the lever 30 at the first or standby position. The second housing 20 then is fit lightly into the receptacle 13 so that the cam followers 21 enter the entrances of the cam grooves 34 (see FIG. 3). The lever 30 then is pivoted in a counter clockwise direction in FIGS. 1 and 3 towards the second or connection position. Thus, the two housings 10, 20 are connected smoothly with each other by the leverage action of the cam grooves 34 and the cam followers 21 even if an operation force given to the lever 30 is small. The housings 10, 20 are connected properly when the lever 30 reaches the second position.

The lever-type connector A with the properly connected housings 10, 20 is fit into the oblong mount hole H from the front side (left side in FIGS. 1 and 3) of the panel P with the receptacle 13 faced toward the mount hole H. The flange 11 of the first housing 10 is brought substantially into contact with the edge of the mount hole H from the front side and projections 12A of the resilient locks 12 engage the edge of the mount hole H from the back side. As a result, the connector A is mounted on the panel P.

The lever-type connector A has an interfering means 40 for preventing the connector A from being mounted into the mount hole H with the lever 30 at the first or standby position. The interfering means 40 is comprised of fixed interfering portions 16 formed on the upper surface of the receptacle 13, and movable interfering portions 35 formed on the arms 32 of the lever 30.

The operable portion 31 of the lever 30 is displaced along an arcuate path adjacent the upper surface of the receptacle 13, as described above. A space between the trace of displacement of the operable portion 31 and the upper surface of the receptacle 13 is a dead space. The fixed interfering ribs 16 utilize this dead space. Specifically, left and right fixed interfering ribs 16 project from the upper surface of the receptacle 13 and extend forward and backward in substantially the same direction as the displacing direction of the operable portion 31. The upper surfaces of the fixed interfering ribs 16 are substantially arcuate and extend substantially parallel with the trace of displacement of the operable portion 31. Thus, the operable portion 31 and the fixed interfering ribs 16 do not interfere with each other regardless of the position of the lever 30 between the standby and connection positions.

The movable interfering portions 35 are formed on outer edges of the arms 32 with respect to the center of rotation of the lever 30, and are at the bottom ends of the arms 32 when the lever 30 is held at the standby position. Further, the movable interfering portions 35 and the fixed interfering ribs 16 are opposite from each other with respect to the center of rotation of the lever 30 when the lever 30 is at the first or standby position.

The bottom ends of the movable interfering portions 35 are lower or radially more outward when the lever 30 is at the first position than when the lever 30 is at the second position. In other words, the movable interfering portions 35 project down beyond the outer surface of the first housing 10 when the lever 30 is at the first position and are in the space 14 between the outer surfaces of the first housing 10 and the receptacle 13 when the lever 30 is at the second position, and hence do not project outward beyond the first housing 10. All portions of the lever 30, other than the movable interfering portions 35, are in the space 14 between the outer surfaces of the first housing 10 and those of the receptacle 13 when the lever is at the second position.

Figure 2:
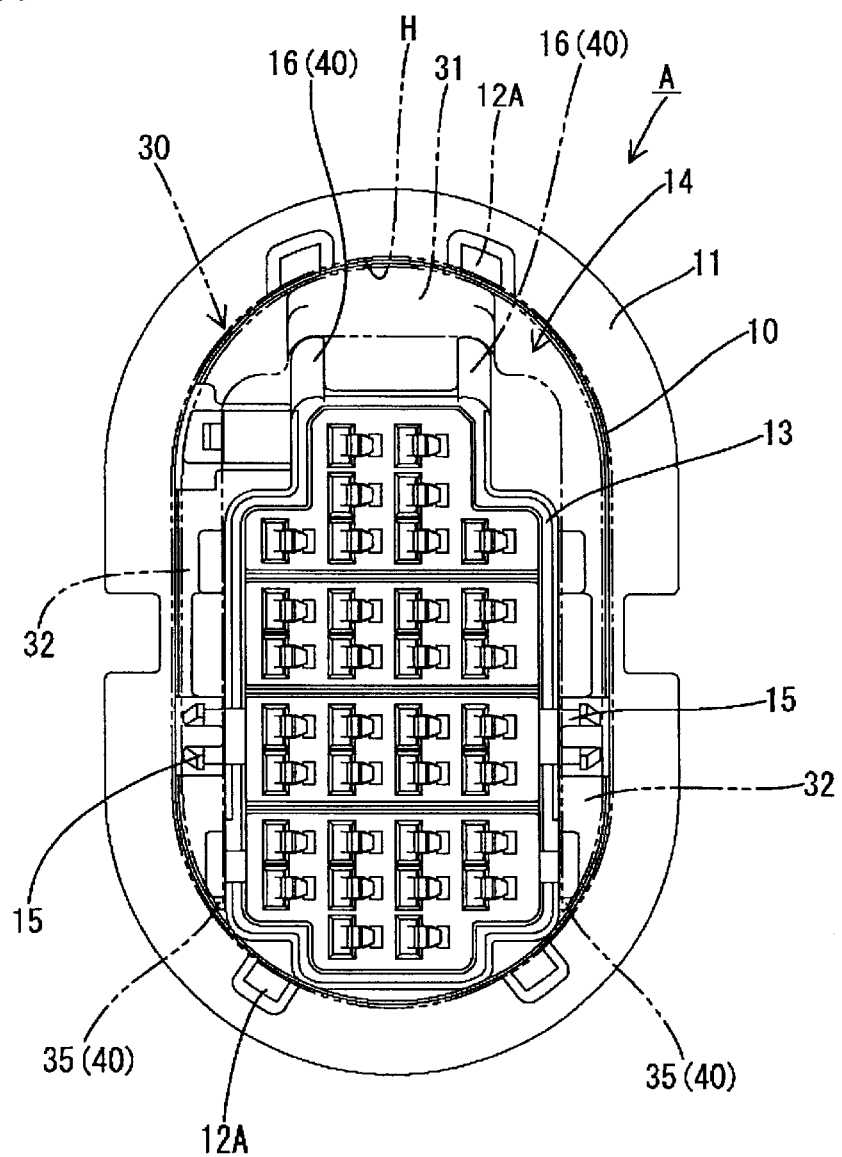
FIG. 2 is a front view of a first housing with the lever at the connection position.
Figure 3:
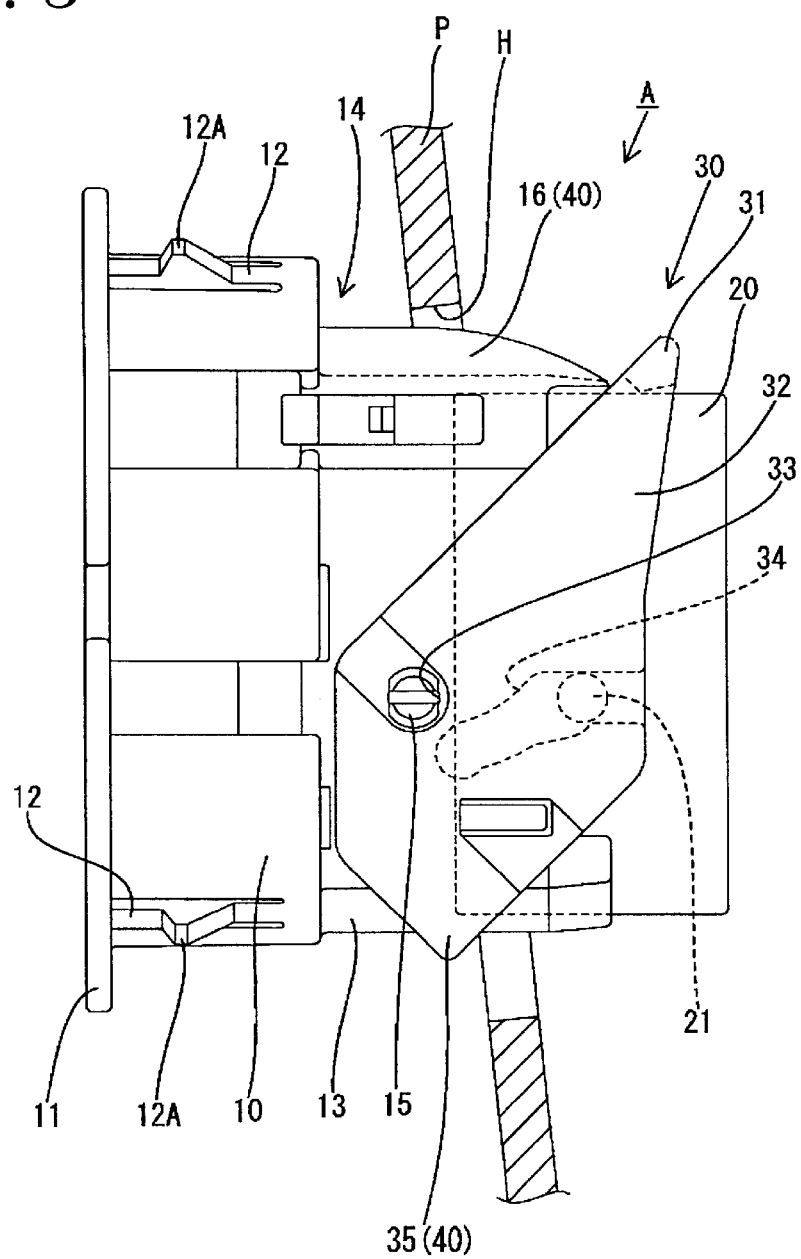
FIG. 3 is a side view showing a state where the lever-type connector is being mounted into a mount hole with the lever held at a standby position.

Both the fixed interfering ribs 16 and the movable interfering portions 35, which form the interfering means 40, can be within the opening area of the mount hole H, as shown in FIG. 2, when the lever 30 is at the connection position. Thus, the lever-type connector A can be fit into the mount hole H without getting caught if properly oriented with respect to the mount hole H.

On the other hand, when the lever 30 is at or near the standby position, the interfering means 40 bulge out of the opening area of the mount hole H and interfere with the edge of the mount hole H. Upper surfaces of the fixed interfering ribs 16 could contact the inner edge of the mount hole H by displacing the entire connector A, as shown in FIG. 4.

However, the movable interfering portions 35 at the bottom of the lever 30 bulge out of the opening area of the mount hole H and interfere with the bottom edge of the mount hole H. Thus, the lever-type connector A cannot be fit into the mount hole H. In other words, the distance from the fixed interfering ribs 16 to the movable interfering portions 35, when the lever 30 is standby position, is greater than an opening width of the mount hole H.

Figure 4:
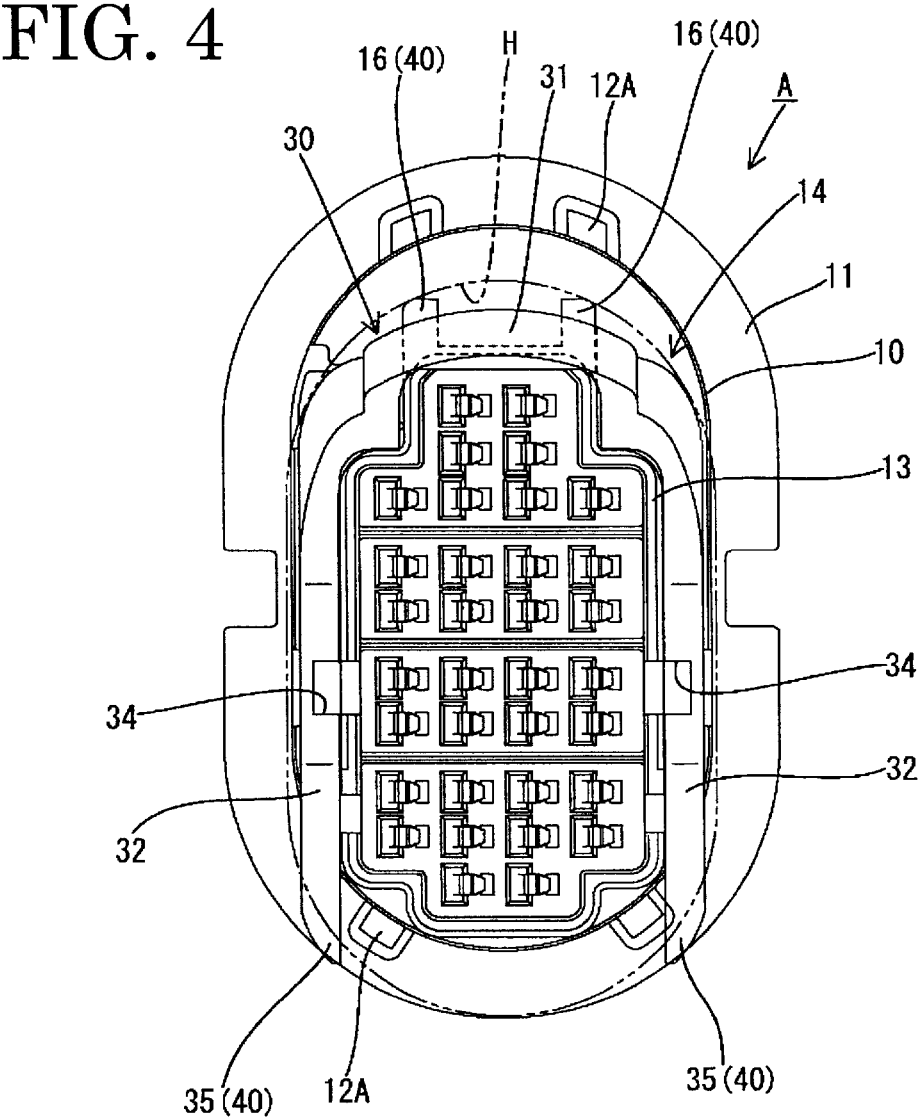
FIG. 4 is a front view of a state where an interfering means interferes with an edge of the mount hole when the lever is at the standby position.
Figure 5:
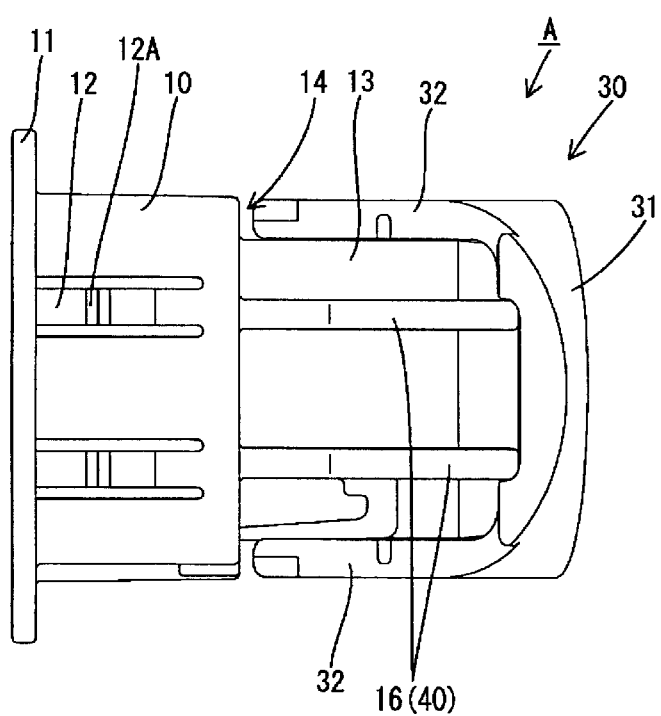
FIG. 5 is a plan view of the first housing with the lever held at the standby position.
Figure 6:
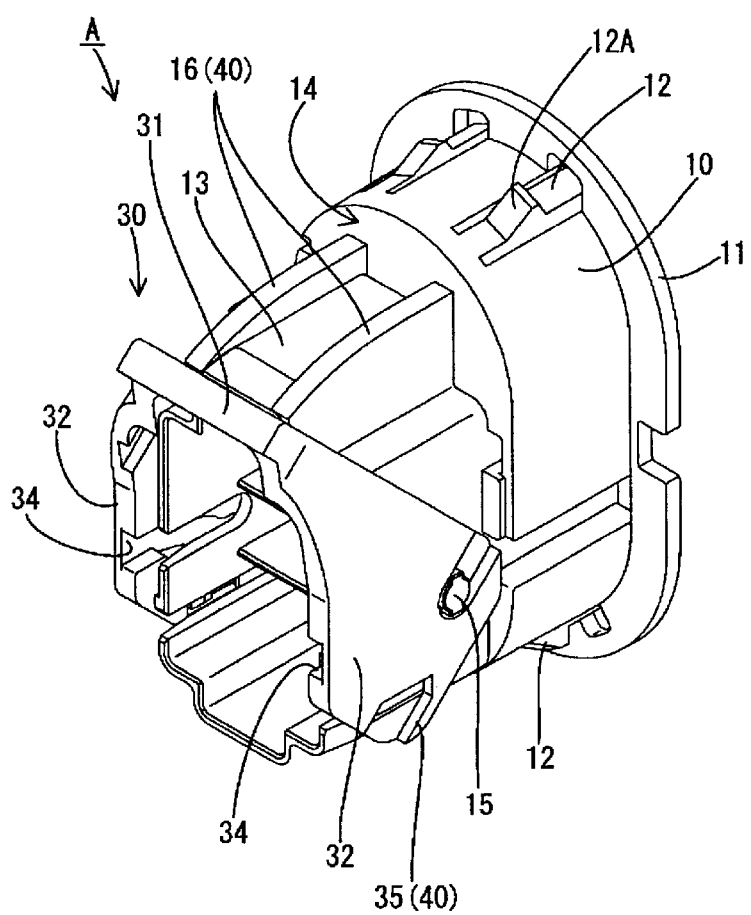
FIG. 6 is a perspective view of the first housing with the lever held at the standby position.

The lever-type connector A could be displaced more upward than the position of FIG. 4 with respect to the mount hole H. However, the fixed interfering ribs 16 and/or the movable interfering portions 35 bulge out of the opening area of the mount hole H and interfere with the edge of the mount hole H. Thus, the lever-type connector A cannot be fit into the mount hole H.

The interfering means 40 can be within the opening area of the mount hole H when the lever 30 is at the second position, but bulges out of the opening area of the mount hole H to interfere with the edge of the mount hole H when the lever 30 is at or near the first position. Thus the connector A cannot be mounted on the panel P with the lever 30 at or near the first position.

The fixed interfering ribs 16 use dead space between the outer surface of the first housing 10 and the trace of displacement of the operable portion 31. Thus, it is not necessary to enlarge the lever 30 to provide the fixed interfering ribs 16, and the lever-type connector A can be small.

The present invention is not limited to the above described and illustrated embodiment. For example, the following embodiment is also embraced by the technical scope of the invention as defined by the claims. Beside the following embodiment, various changes can be made without departing from the scope and spirit of the invention as defined by the claims.

The interfering means comprises the movable interfering portions on the lever and the fixed interfering portions on the first housing in the foregoing embodiment. However, it may be comprised only of the movable interfering portions on the lever. Alternatively, the lever may have two interfering portions at the opposite sides with respect to the center of rotation of the lever and the interfering means may comprise these two interfering portions.

The movable interfering portions are at the opposite side of the operable portion with respect to the center of rotation of the lever in the foregoing embodiment. However, they may be at the operable portion. In such a case, the movable interfering portions may be displaced more toward the outer surface of the first housing as the lever is pivoted from the first or standby position to the second or connection position.

The connector has been described with respect to a connector with a pivotable lever. However, the invention may also refer to a connector with another movable member, such as a linearly displaceable slider with a cam means that can cooperate with cam means on the second housing.

What is claimed is:

1. A connector comprising first and second housings connectable to one another and a movable member movably mounted on the first housing for movement between first and second positions, a cam mechanism on the movable member and the second housing for effecting connection of the housings in response to movement of the movable member from the first position to the second position, the connector being mountable in a mount hole in a panel after the first housing and the second housing are connected, comprising:
   an interfering means including at least one movable interfering portion on the movable member and dimensioned for location entirely within an opening area of the mount hole when the movable member is at the second position, and dimensioned for bulging out of the opening area of the mount hole when the movable member is at the first position, thereby interfering with an edge of the mount hole.

2. The connector of claim 1, wherein the cam mechanism comprises a cam follower on the second housing which can enter a cam groove in the movable member when the movable member is at the first position.

3. The connector of claim 2, wherein the movable member is a lever pivotally provided on the first housing.

4. The connector according of claim 3, wherein the first position of the lever is a standby position and the second position is a connection position at which the housings are connected with each other.

5. The connector of claim 1, wherein the lever has an operable portion and two arms extending from the operable portion, the arms being pivotally supported on the first housing such that the operable portion is displaceable through an arc along an outer surface of the first housing as the lever pivots between the first and second positions, the movable interfering portion being on an outer edge of at least one arm at a side opposite the operable portion with respect to a center of rotation of the lever.

6. The connector of claim 5, wherein the interfering means further includes at least one fixed interfering portion formed on an outer surface of the first housing between the operable portion and the first housing, and projecting arcuately along the displacement path of the operable portion so as not to interfere with the operable portion.

7. The connector of claim 6, wherein at least one of the movable and fixed interfering portions bulges out of the opening area of the mount hole when the lever is at the first position.

8. The connector of claim 7, wherein the fixed interfering portion comprises at least one rib projecting from the outer surface of the first housing, the rib having a substantially arcuate shape extending substantially parallel to the displacement path of the operable portion.

9. A connector comprising first and second housings connectable to one another and a movable member movably mounted on the first housing for movement between first and second positions, a cam mechanism on the movable member and the second housing for effecting connection of the housings in response to movement of the movable member from the first position to the second position, the connector being mountable in a mount hole in a panel in a preferred orientation after the first housing and the second housing are connected, the mount hole defining a cross section, comprising:
   an interfering means including at least one movable interfering portion on the movable member and defining a cross section smaller than the cross section of the mount hole when the movable member is at the first position such that the interfering portion is dimensioned for disposition within the opening area of the mount hole when the movable member is at the first position, and defining a cross section greater than the cross section of the mount hole when the movable member is at the second position such that the interfering portion bulges out of the opening area of the mount hole when the movable member is at the second position, thereby interfering with an edge of the mount hole.

10. The connector of claim 9, wherein the cam mechanism comprises a cam follower on the second housing which can enter a cam groove in the movable member when the movable member is at the first position.

11. The connector of claim 10, wherein the movable member is a lever pivotally provided on the first housing.

12. The connector of claim 9, wherein the lever has an operable portion and two arms extending from the operable portion, the arms being pivotally supported on the first housing such that the operable portion is displaceable through an arc along an outer surface of the first housing as the lever pivots between the first and second positions, the movable interfering portion being on an outer edge of at least one arm at a side opposite the operable portion with respect to a center of rotation of the lever.

13. The connector of claim 12, wherein the interfering means further includes at least one fixed interfering portion formed on an outer surface of the first housing between the operable portion and the first housing, and projecting arcuately along the displacement path of the operable portion so as not to interfere with the operable portion.

14. The connector of claim 13, wherein at least one of the movable and fixed interfering portions bulges out of the opening area of the mount hole when the lever is at the first position.

15. The connector of claim 14, wherein the fixed interfering portion comprises at least one rib projecting from the outer surface of the first housing, the rib having a substantially arcuate shape extending substantially parallel to the displacement path of the operable portion.

* * * * *